US010203451B2

(12) United States Patent
Li

(10) Patent No.: US 10,203,451 B2
(45) Date of Patent: Feb. 12, 2019

(54) MOBILE TERMINAL MEDIUM CASING AND MOBILE TERMINAL

(71) Applicants: BOE Technology Group Co., Ltd., Beijing (CN); BOE Optical Science and Technology Co., Ltd., Jiangsu (CN)

(72) Inventor: Wenjun Li, Beijing (CN)

(73) Assignees: BOE TECHNOLOGY GROUP CO., LTD., Beijing (CN); BOE OPTICAL SCIENCE AND TECHNOLOGY CO., LTD., Suzhou (CN)

( * ) Notice: Subject to any disclaimer, the term of this patent is extended or adjusted under 35 U.S.C. 154(b) by 0 days.

(21) Appl. No.: 15/676,139

(22) Filed: Aug. 14, 2017

(65) Prior Publication Data
US 2018/0136388 A1 May 17, 2018

(30) Foreign Application Priority Data

Nov. 11, 2016 (CN) .......................... 2016 1 0998751

(51) Int. Cl.
F21V 8/00 (2006.01)
(52) U.S. Cl.
CPC .......... *G02B 6/0088* (2013.01); *G02B 6/009* (2013.01); *G02B 6/0083* (2013.01); *G02B 6/0055* (2013.01)

(58) Field of Classification Search
CPC ... G02B 6/0088; G02B 6/0055; G02B 6/0083
See application file for complete search history.

(56) References Cited

U.S. PATENT DOCUMENTS

| 8,684,581 | B2* | 4/2014 | Jeon | G02B 6/0073 |
| | | | | 362/249.02 |
| 9,565,278 | B2* | 2/2017 | Yoo | H04M 1/0202 |
| 2014/0092625 | A1* | 4/2014 | Lin | G02B 6/005 |
| | | | | 362/606 |
| 2014/0133174 | A1* | 5/2014 | Franklin | H05K 9/0067 |
| | | | | 362/606 |
| 2016/0320658 | A1* | 11/2016 | Reightler | G02F 1/133308 |

* cited by examiner

Primary Examiner — Mary Ellen Bowman
(74) Attorney, Agent, or Firm — Westman, Champlin & Koehler, P.A.

(57) ABSTRACT

The disclosure provides a mobile terminal medium casing and a mobile terminal. The mobile terminal medium casing includes a casing body having a receiving groove; a reflective sheet, a light guiding plate and an optical sheet group laminated in order, in a direction away from a bottom of the receiving groove, on the bottom of the receiving groove; and a light source assembly located in the receiving groove, an illuminant of the light source assembly being located at a light incidence side of the light guiding plate.

11 Claims, 3 Drawing Sheets

MOBILE TERMINAL MEDIUM CASING AND MOBILE TERMINAL

CROSS-REFERENCE TO RELATED APPLICATION

The present application claims priority to Chinese Patent Application No. 201610998751.6.X, filed on Nov. 11, 2016, entitled "Mobile terminal medium casing and mobile terminal", which is incorporated herein by reference in its entirety.

BACKGROUND OF THE INVENTION

Field of the Invention

The disclosure relates to technical field of mobile terminal, and particularly to a mobile terminal medium casing and a mobile terminal.

Description of the Related Art

A mobile terminal, such as a mobile phone, a tablet computer, etc., as an electronic product, becomes widely used and more important in people's daily life. With a high-speed development of the mobile terminal, requirements on the mobile terminal from people increase more and more highly. For example, for a mobile terminal with a same size, such as a smart mobile phone of 5 inch, a visual area is required to be large as possible. That is, the rim frame of the mobile terminal is as small as possible. When an existing mobile terminal displays, back light is generally provided by a backlight module. The backlight module of the mobile terminal commonly includes a back plate, an adhesive frame, a light source assembly, a reflective sheet, a light guiding plate and an optical sheet group. The reflective sheet, the light guiding plate and the optical sheet group are laminated in order on the back plate. The adhesive frame is located in the back plate. The light source assembly is mounted and fixed on the adhesive frame. The illuminant of the light source assembly faces a light incidence face of the light guiding plate. Due to the structure of the backlight module of the existing mobile terminal, the rim frame of the mobile terminal is rather wide.

SUMMARY OF THE INVENTION

The present disclosure provides a mobile terminal medium casing and a mobile terminal that may reduce rim frame of a mobile terminal.

In order to achieve the above object, the present disclosure provides the following technical schemes:

An aspect of the present disclosure, there is provided a mobile terminal medium casing including:

a casing body having a receiving groove;

a reflective sheet, a light guiding plate and an optical sheet group laminated in order, in a direction apart away from a bottom of the receiving groove, on the bottom of the receiving groove; and a light source assembly within the receiving groove, an illuminant of the light source assembly being located at a light incidence side of the light guiding plate.

As an aspect, the casing body is further provided with a through hole, and a light source circuit board of the light source assembly passes through the through hole to electrical connect with a power supply of the mobile terminal.

As an aspect, the light source circuit board of the light source assembly is respectively coupled to edge of a light exiting surface of the light guiding plate and edge of a wall of the receiving groove, through a back adhesive.

As an aspect, the mobile terminal medium casing further comprises a light blocking glue that cover the light source circuit board and edge of the optical sheet group.

As an aspect, the light blocking glue is a black double-sided adhesive or a black single-sided adhesive.

As an aspect, the walls of the receiving groove are all treated through a black coating process.

As an aspect, the casing body is made of metal.

As an aspect, the casing body is made of aluminum alley.

As an aspect, the optical sheet group comprises a diffuser sheet, a lower prism sheet and an upper prism sheet laminated in that order over the light guiding plate.

As an aspect, the casing body is further provided with a power supply groove and an opening of the power supply groove is located at a side of the casing body opposite to a side thereof where an opening of the receiving groove is located.

As an aspect, the light source circuit board has a first portion that extends along an upper surface of the illuminant and is coupled to the edge of a light exiting surface of the light guiding plate and the edge of the wall of the receiving groove, and a folding portion configured to pass through the through hole to be electrically coupled to the power supply within the power supply groove.

An aspect of the present disclosure provides a mobile terminal including the above mobile terminal medium casing.

BRIEF DESCRIPTION OF THE DRAWINGS

The drawings herein are provided to further understand the present disclosure and constitute a part of the present disclosure. The schematic embodiments of the present disclosure and description thereof are used to interpret the present disclosure instead of limit the present disclosure.

DETAILED DESCRIPTION OF PREFERRED EMBODIMENTS OF THE INVENTION

Figure 1:
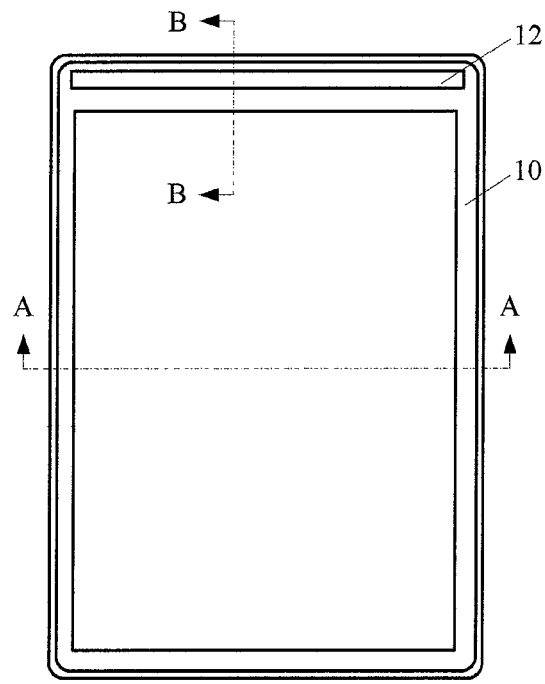
FIG. 1 is a schematic structural view of a mobile terminal medium casing according to an embodiment of the present disclosure.

A mobile terminal medium casing and a mobile terminal provided according to embodiments of the present disclosure is further described in detail in conjunction with the drawings.

Referring to FIGS. 1~5, a mobile terminal medium casing provided according to embodiments of the present disclosure includes a casing body 10 having a receiving groove 11; a reflective sheet 20, a light guiding plate 30 and an optical sheet group 40 laminated in that order on a bottom of the receiving groove 11; a light source assembly 50 located in the receiving groove 11, the light source assembly 50 including an illuminant 52 that is located at a light incidence side of the light guiding plate 30.

Referring to FIGS. 1~5 again, the mobile terminal medium casing according to embodiments of the present disclosure includes a casing body 10, a reflective sheet 20, a light guiding plate 30, an optical sheet group 40 and a light source assembly 50; the casing body 10 is configured with a receiving groove 11 therein and the reflective sheet 20, the light guiding plate 30 and the optical sheet group 40 are laminated in that order on a bottom of the receiving groove 11. The light source assembly 50 may include a light source circuit board 51 and an illuminant 52 coupled to the light source circuit board 51. For example, the illuminant 52 may be configured on a side of the light source circuit board 51. The light source circuit board 51 may be a flexible circuit board. The illuminant 52 may be a light emitting diode (LED) lamp. The light source circuit board 51 of the light source assembly 50 is coupled to the casing body 10. The illuminant 52 of the light source assembly 50 is located at the light incidence side of the light guiding plate 30. In an embodiment, the reflective sheet 20, the light guiding plate 30, the optical sheet group 40 and the light source assembly 50 are received in the receiving groove 11. That is, the reflective sheet 20, the light guiding plate 30, the optical sheet group 40 and the light source assembly 50 are integrated to the casing body 10.

In an embodiment of the present disclosure, the mobile terminal medium casing according to the embodiment of the present disclosure may be implemented in a mobile terminal, and the mobile terminal medium casing may not only be used as a supporting component for supporting a power supply, a drive chip, etc. of the mobile terminal but also used as a backlight source providing back light for a display panel of the mobile terminal. Further, when the mobile terminal medium casing according to the embodiment of the present disclosure is used as the backlight source providing back light for the display panel of the mobile terminal, configuration of a frame sealing glue and a back plate may be abandoned and thus, in contrast to the prior art, a space that is preset for the back plate and the frame sealing glue at an edge of the mobile terminal may be reduced, thereby reducing edge portion of the mobile terminal.

In addition, as the mobile terminal medium casing according to the embodiment of the present disclosure is integrally provided with the reflective sheet 20, the light guiding plate 30, the optical sheet group 40 and the light source assembly 50, the mobile terminal medium casing, when used in a mobile terminal, may be used a backlight source providing back light for the display panel of the mobile terminal, and further, it renders abandoning the frame sealing glue and the back plate, thereby increasing covering area of the back light emitted by the optical sheet group 40, that is, increasing view area region of the backlight source of the mobile terminal and thus in turn increasing the view area region of the mobile terminal.

Further, as the mobile terminal medium casing according to the embodiment of the present disclosure is integrally provided with the reflective sheet 20, the light guiding plate 30, the optical sheet group 40 and the light source assembly 50, the mobile terminal medium casing, when used in a mobile terminal, may be used a backlight source providing back light for the display panel of the mobile terminal and it renders abandoning of the frame sealing glue and the back plate, thereby saving production process of the mobile terminal and reducing producing cost of the mobile terminal. Particularly, when a product with a narrow edge rim is made, the frame sealing glue involves serious deformation and thus is hard to be manufactured due to small thickness. The embodiment may abandon the frame sealing glue and thus lower the level of difficulty for producing the mobile terminal.

The mobile terminal may be a mobile phone, a tablet computer, etc. The mobile terminal medium casing according to the embodiments of the present disclosure may be a medium casing of a mobile phone, a medium casing of a tablet computer, etc., and a size of the mobile terminal medium casing may be set according to various and specific requirement of the application situation. The size of the mobile terminal medium casing may include a length L thereof, a width W thereof, and a thickness H thereof, etc.

Figure 3:
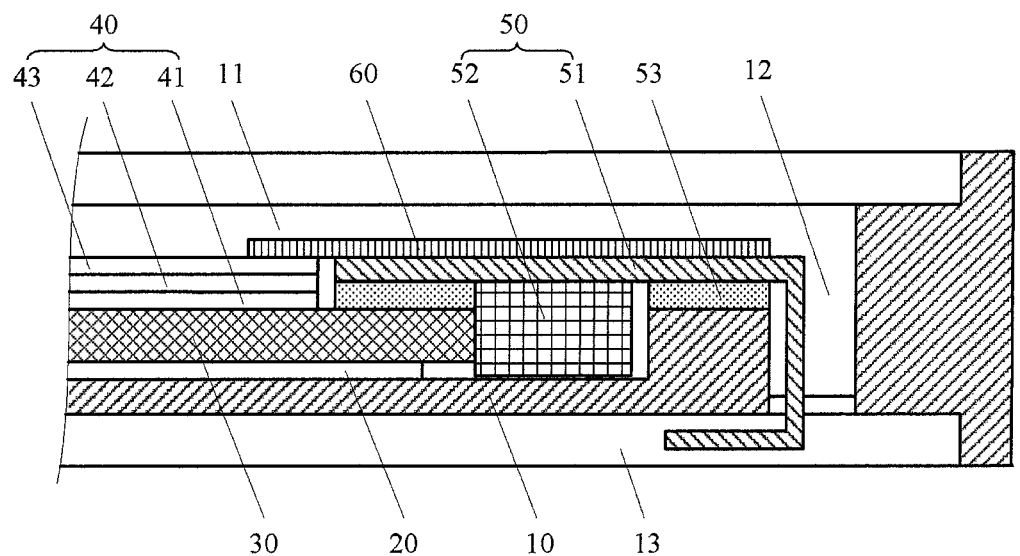
FIG. 3 is a cross section view, along line B-B of FIG. 1, of the mobile terminal medium casing.
Figure 4:
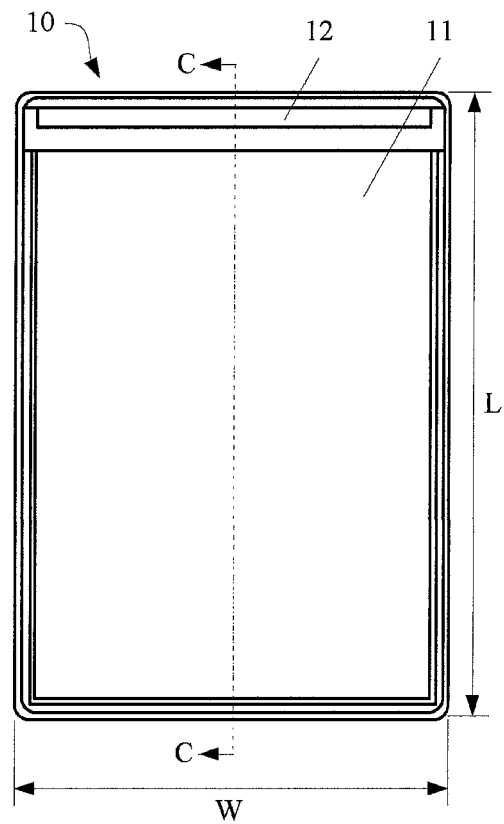
FIG. 4 is schematic structural view of a casing body of the mobile terminal medium casing as shown in FIG. 1.
Figure 5:
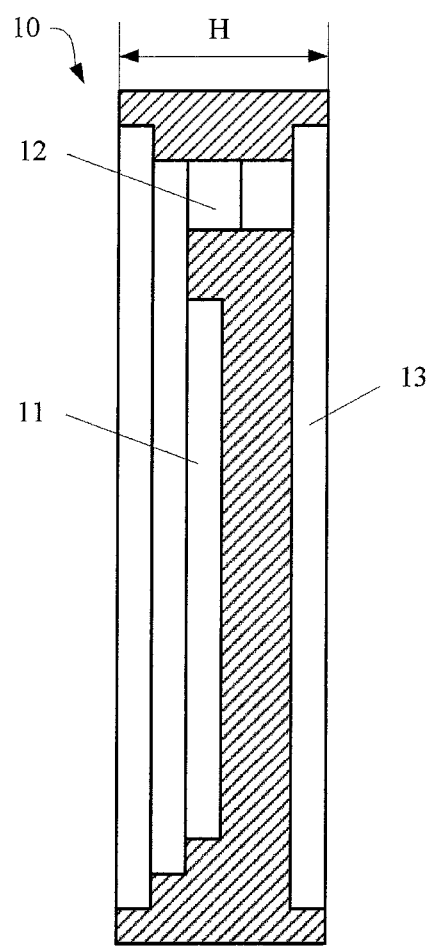
FIG. 5 is a cross section view, along line C-C of FIG. 4, of the mobile terminal medium casing.

In practice, when the mobile terminal medium casing is used in a mobile terminal, the power supply of the mobile terminal may also be mounted to the mobile terminal medium casing. For example, referring to FIGS. 4~5, in the mobile terminal medium casing according to embodiments of the present disclosure, the casing body 10 is further provided with a power supply groove 13 and an opening of the power supply groove 13 is located at a side of the casing body opposite to where an opening of the receiving groove 11 is located. In other words, the power supply groove 13 is located in a back face of the casing body 10, that is, the opening of the power supply groove 13 is located at a side of the casing body 10 that is opposite to the side face where the opening of the receiving groove 11 is located. The casing body 10 is further configured with a through hole 12. The light source circuit board 51 of the light source assembly 50 disposed on a wall of the receiving groove 11 passes through the through hole 12 and extends into the power supply groove 13, and is in connection with the power supply in the power supply groove 13 of the casing body 10. The power supply supplies electrical power to the light source assembly 50. In the embodiment, the light source circuit board 51 has a folding shape. The light source circuit board 51 has a first portion that extends along an upper surface of the illuminant and is coupled to an edge of a light exiting surface of the light guiding plate 30 and an edge of the wall of the receiving groove 11. When the mobile terminal medium casing is placed as shown in FIG. 3, the first portion may be a horizontal portion and may shield the light emitted by the illuminant 52. A folding portion is further provided in the light source circuit board 51 and may be a vertical portion when the mobile terminal medium casing is placed as shown in FIG. 3. The folding portion of the light source circuit board 51 may pass through the through hole 12 to be electrically coupled to the power supply in the power supply groove 13. The structure of the light source circuit board 51 according to embodiments of the disclosure is advantageous as it can be connected to the power supply to supply electrical power to the light source while it may shield the light of the illuminant so as to avoid light to be leaked.

In the above embodiment, a position of the through hole 12 may be adjusted depending on configuration of the light source assembly 50. For example, referring to FIGS. 1~3, the light source assembly 50 is disposed on an upper portion of the wall of the receiving groove 11 as shown in FIG. 1, and the through hole 12 may be disposed on an outer edge of the upper portion of the wall of the receiving groove 11 as shown in FIG. 1, that is, the through hole 12 may be disposed at the edge of the casing body 10 close to the upper side as shown in FIG. 1, facilitating the light source circuit board 51 of the light source assembly 50 to pass through the through hole 12 into the power supply groove 13 and be electrically connected with the power supply in the power supply groove 13 of the casing body 10.

Integrating the light source assembly 50 with the mobile terminal medium casing may be implemented by coupling the light source circuit board 51 of the light source assembly 50 to the casing body 10. When coupling the light source circuit board 51 of the light source assembly 50 to the casing body 10, the light source circuit board 51 may be directly adhered to the bottom of the receiving groove 11, or the light source circuit board 51 may be directly adhered to the wall of the receiving groove 11, or, referring to FIG. 3, the light source circuit board 51 may be coupled to the edge of the wall of the receiving groove 11 and the edge of the light exiting surface of the light guiding plate 30 through an adhesive 53. In the configuration as shown in FIG. 3, when the illuminant 52 emits light, the light source circuit board 51 may shield the light emitted by the illuminant 52, preventing light from leaking.

Figure 2:
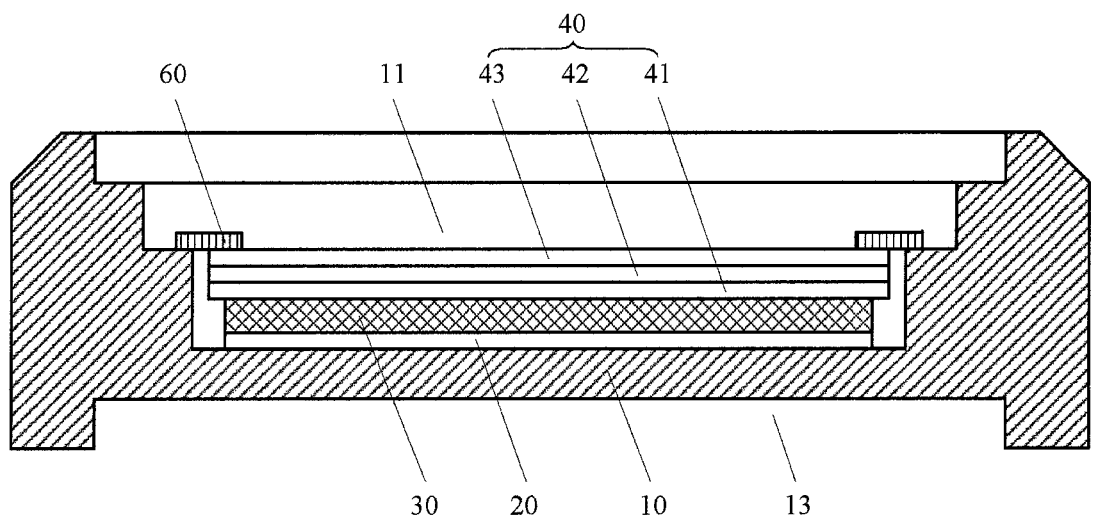
FIG. 2 is a cross section view, along line A-A of FIG. 1, of the mobile terminal medium casing.

Referring to FIGS. 2 and 3 continuously, the mobile terminal medium casing according to embodiments of the present disclosure may further include a light blocking glue 60. The light blocking glue 60 covers the light source circuit board 51 and an edge of the optical sheet group 40, that is, the light blocking glue 60 may shield the light source assembly 50 and thus further shield the light emitted by the illuminant 52, preventing light from leaking. The light blocking glue 60 may be a black double-sided adhesive or a black single-sided adhesive.

As the mobile terminal medium casing according to embodiments of the present disclosure is implemented in a mobile terminal, when the mobile terminal is used, the power supply of the mobile terminal supplies electrical power to the illuminant 52 through the light source circuit board 51 such that the illuminant 52 emits light. The light emitted by the illuminant 52 is reflected by the reflective sheet 20, guided by the light guiding plate 30, treated by the optical sheet group 40 and then is emitted from an upper surface of the optical sheet group 40 as shown in FIG. 2, providing back light for a display panel of the mobile terminal. When the light emitted by the illuminant 52 passes through the reflective sheet, the light guiding plate 30 and the optical sheet group 40, a portion of the light will be scattered towards the wall of the receiving groove 11, which renders appearance of light line at periphery of the mobile terminal when a user uses the mobile terminal. In order to avoid the appearance of light line at the periphery of the mobile terminal, all the walls of the receiving groove 11 may be treated through a black coating process so as to absorb the light scattered towards the wall of the receiving groove 11, avoiding light lines at the periphery of the mobile terminal.

In the above embodiment, the casing body 10 may be made of suitable material as required. For example, the casing body 10 may be made of metal, plastic material, etc. In the mobile terminal medium casing provided by the embodiment of the present disclosure, the casing body 10 is made of metal. With such a design, in an aspect, the casing body 10 made of metal may transfer and spread out thermal energy generated by the light source assembly 50 during its operation due to good thermal conductivity or big coefficient of heat transfer of the metal, and thus has an increased heat transfer efficient, increasing service life of the mobile terminal; in another aspect, the casing body 10 made of metal may involve reduced difficulty during manufacturing the casing body as metal has a good strength and machining property, and also may achieve a thinness design of the casing body 10. The metal for producing the casing body 10 may be copper, steel, aluminum or alloy. In the embodiment of the present disclosure, the casing body 10 is made of aluminum. In the embodiment, the casing body 10 has a thickness of about 0.2 mm.

Continuously referring to FIGS. 2 and 3, in the mobile terminal medium casing according to the embodiment of the present disclosure, the optical sheet group 40 includes a diffuser sheet 41, a lower prism sheet 42 and an upper prism sheet 42 laminated in that order over the light guiding plate 30. The light emitted by the illuminant 52 of the light source assembly 50 runs via the reflective sheet 20 and the light guiding plate 30, and enters the diffuser sheet 41, then passes through the lower prism sheet 42 and the upper prism sheet 43 in sequence, exits from the surface of the upper prism sheet 43 opposite to the lower prism sheet 42, that is, exits from the upper surface of the upper prism sheet 43 as shown in FIGS. 2 and 3, providing back light with high quality for the display panel of the mobile terminal.

Embodiments of the present disclosure further provide a mobile terminal including the mobile terminal medium casing as described above.

The mobile terminal has similar advantages relative to the prior art as the above mobile terminal medium casing and they are not repeatedly described.

In the above description, the specific features, structures, materials or other characteristics may be combined in a suitable manner in any one or more embodiments or examples.

The above description merely relates embodiments of the present disclosure, and the protective scope of the present disclosure is not limited to this. The replacement or medication that is obtained by those skilled in the art based on the above description shall fall into the scope of the present disclosure. The protective scope of the present disclosure is defined by the claims.

The invention claimed is:

1. A mobile terminal medium casing comprising:
  a casing body having a receiving groove;
  a reflective sheet, a light guiding plate and an optical sheet group laminated in order, in a direction apart away from a bottom of the receiving groove, on the bottom of the receiving groove; and
  a light source assembly in the receiving groove, an illuminant of the light source assembly being located at a light incidence side of the light guiding plate,
  wherein the casing body is further provided with a through hole, the through hole traversing through a side of the casing body where the bottom of the receiving groove is located, and a light source circuit board of the light source assembly passes through the through hole to be electrically connected with a power supply of the mobile terminal.

2. The mobile terminal medium casing according to claim 1, wherein a light source circuit board of the light source assembly is coupled to an edge of a light exiting surface of the light guiding plate and an edge of a wall of the receiving groove, through a back adhesive.

3. The mobile terminal medium casing according to claim 2, wherein the mobile terminal medium casing further comprises a light blocking glue that covers the light source circuit board and an edge of the optical sheet group.

4. The mobile terminal medium casing according to claim 3, wherein the light blocking glue is a black double-sided adhesive or a black single-sided adhesive.

5. The mobile terminal medium casing according to claim 1, wherein walls of the receiving groove are all treated through a black coating process.

6. The mobile terminal medium casing according to claim 1, wherein the casing body is made of metal.

7. The mobile terminal medium casing according to claim 6, wherein the casing body is made of aluminum alloy.

8. The mobile terminal medium casing according to claim 1, wherein the optical sheet group comprises a diffuser sheet, a lower prism sheet and an upper prism sheet laminated in that order over the light guiding plate.

9. The mobile terminal medium casing according to claim 2, wherein the casing body is further provided with a power supply groove and an opening of the power supply groove is located at a side of the casing body opposite to where an opening of the receiving groove is located.

10. The mobile terminal medium casing according to claim 9, wherein the light source circuit board has a first portion that extends along an upper surface of the illuminant and is coupled to the edge of the light exiting surface of the light guiding plate and the edge of the wall of the receiving groove, and a folding portion configured to pass through a through hole to be electrically coupled to a power supply in the power supply groove.

11. A mobile terminal comprising the mobile terminal medium casing according to claim 1.

* * * * *